United States Patent [19]

Galtz

[11] 4,014,500
[45] Mar. 29, 1977

[54] TEMPERATURE SET BACK

[76] Inventor: Charles S. Galtz, 2863 Beechwood Blvd., Pittsburgh, Pa. 15217

[22] Filed: Sept. 8, 1975

[21] Appl. No.: 611,078

[52] U.S. Cl. .......................... 236/46 R; 236/68 B; 337/377; 219/434
[51] Int. Cl.² ...................................... G05D 23/30
[58] Field of Search .................... 236/68 B, 46 R, ; 219/511, 434; 337/377, 103

[56] References Cited

UNITED STATES PATENTS

| | | | |
|---|---|---|---|
| 1,798,923 | 3/1931 | Baker | 236/68 B |
| 1,923,083 | 8/1933 | Fisher | 219/365 |
| 2,548,424 | 4/1951 | Dicke | 236/68 B |
| 2,611,855 | 9/1952 | Turner | 219/511 |
| 2,849,185 | 8/1958 | Keyes | 236/68 B |
| 3,339,043 | 8/1967 | Baak | 219/511 |
| 3,834,618 | 9/1974 | Buckwalter | 236/46 |
| 3,849,753 | 11/1974 | Nichols | 337/377 X |

*Primary Examiner*—William E. Wayner
*Attorney, Agent, or Firm*—Hymen Diamond

[57] ABSTRACT

The room thermostat for the room whose temperature is to be set-back is enclosed in an enclosure having an air inlet at the bottom and an air outlet at the top. Air from the room flows into the enclosure through the inlet and out through the outlet. During the interval when the temperature is to be set-back, the inlet air is preheated by a lamp in a second enclosure in communication with the first enclosure through the inlet. The lamp remains energized throughout the whole set-back interval. To set the magnitude of the set-back the lamp is pivotal between a position where substantially all of its heat is maintained within the second enclosure and a position where a large portion of its heat is dissipated outside of the second enclosure. The room thermostat responds to the increased temperature in the first enclosure to set-back the ambient temperature in the room.

8 Claims, 10 Drawing Figures

U.S. Patent    Mar. 29, 1977    Sheet 1 of 3    4,014,500
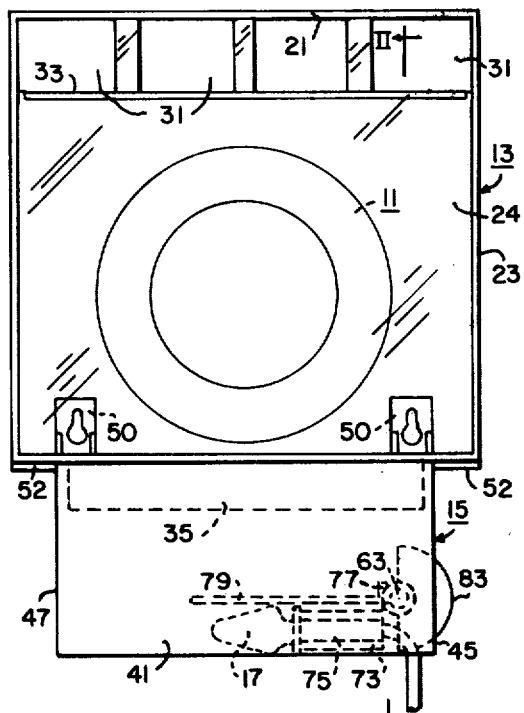
FIG.1
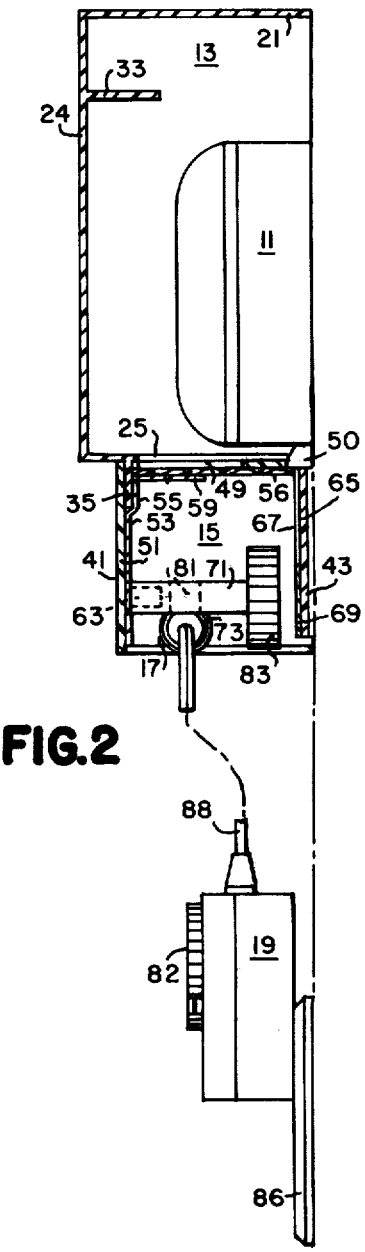
FIG.2
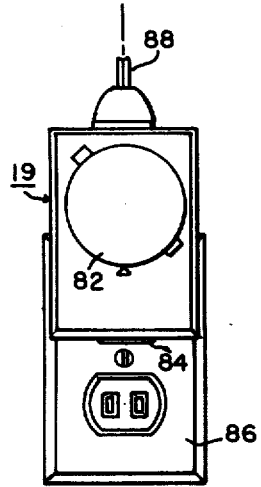
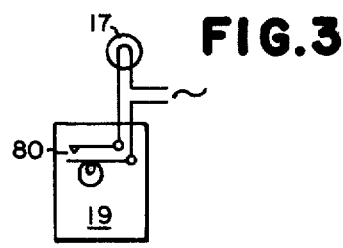
FIG.3

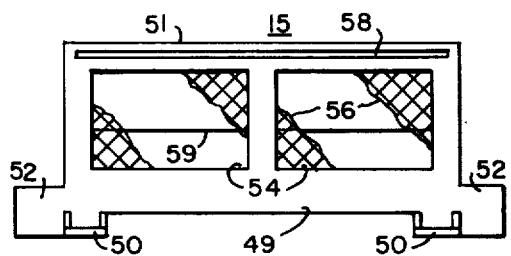
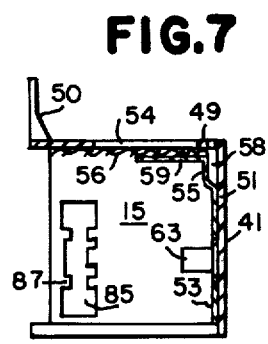
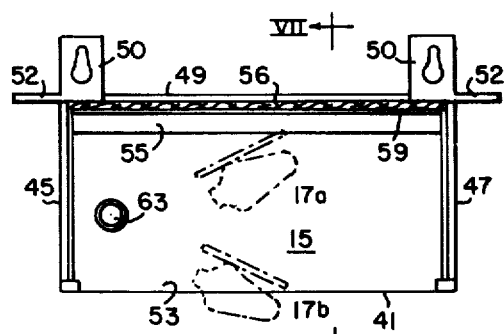
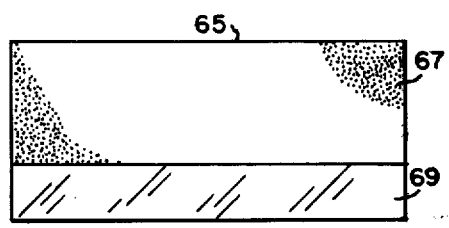
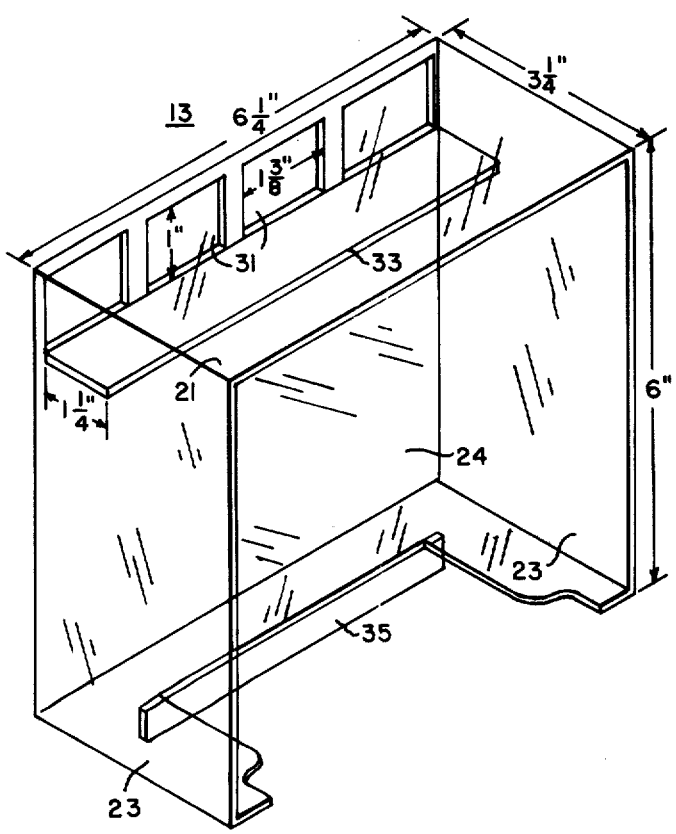

4,014,500

TEMPERATURE SET BACK

REFERENCE TO RELATED DOCUMENTS

U.S. Pat. No. 3,834,618, Buckwalter.

BACKGROUND OF THE INVENTION

This invention relates to the art of temperature control and has particular relationship to set-back control of temperature sensing apparatus for a region to set-back the temperature in the region. In set-back control the temperature of a region under the control of a thermostat, typically of a room under the control of a room thermostat, is set-back during certain intervals by local heating of the air enveloping the thermostat. The thermostat responds to the increased temperature which it senses to set-back the temperature in the region. The purpose of such a set-back system is to effect a saving in fuel without having to modify the electrical wiring of the existing house temperature control apparatus.

The most up to date prior art on temperature set-back is typified by Buckwalter patent. Typical prior art apparatus such as Buckwalter's is complicated. For example, Buckwalter's control includes a bi-metal switch (40 FIG. 3) which turns the local heater (28) off and on during the set-back interval.

It is an object of this invention to overcome the disadvantages of the prior art and to provide a low-cost set-back control of uncomplicated structure, to be used in conjunction with an existing room thermostat and which shall effectuate the set-back control and shall not be susceptible to instability due to surrounding air currents.

SUMMARY OF THE INVENTION

This invention arises from the realization that the difficulty with the prior art apparatus such as Buckwalter's, and the reason for its complexity, is that the cold air above the thermostat rapidly diffuses into the heated air flowing into the thermostat from below producing instability of the temperature at the thermostat. The heated air which flows into the thermostat must then be heated instantaneously to a higher temperature than required to achieve the set-back temperature desired and, as taught by Buckwalter, the heating must be switched on and off to achieve an average temperature of the heated air which yields the desired set-back temperature.

In accordance with this invention the thermostat is enclosed in an enclosure which has an inlet on one side, usually below the thermostat, and an outlet on another side, usually above the thermostat. The outlet is in the front wall while the top of the enclosure is solid so that air cannot diffuse into the enclosure through the top. Air heated by a heater flows into the inlet and out of the outlet. The walls and particularly the top of the enclosure prevent cold air from diffusing into the heated air and the set-back-setting temperature within the enclosure which the thermostat senses remains stable.

The set-back control in accordance with this invention can also be used to effect fuel economies with a cooling system (air-conditioning apparatus) controlled by a wall-mounted thermostat. In this case the set-back unit is energized in a reverse manner; i.e., the air in the enclosure is heated during normal cooling periods (daytime) and is deenergized during periods in which higher temperature levels can be tolerated. The set-back in this case is an increase in room temperature rather than a decrease in room temperature.

BRIEF DESCRIPTION OF THE DRAWINGS

For a better understanding of this invention both as to its organization and as to its method of operation, together with additional objects and advantages thereof, reference is made to the following description, taken in connection with the accompanying drawings, in which:

FIG. 1 is a view in front elevation showing an embodiment of this invention;

FIG. 2 is a view in section taken along line II—II of FIG. 1 but with the room thermostat and lamp unsectioned;

FIG. 3 is a schematic showing the electrical circuit used in the typical practice of this invention;

FIG. 4 is an isometric view of the enclosure of the apparatus shown in FIG. 1;

FIG. 5 is a plan view as seen from the top of the enclosure for the heater of the apparatus shown in FIG. 1;

FIG. 6 is a simplified view in side elevation of the enclosure shown in FIG. 5 with the side wall and the parts for moving the heater removed;

FIG. 7 is a view in section taken along line VII—VII of FIG. 6;

FIG. 8 is a view in front elevation of a heat-distribution plate of the apparatus shown in FIG. 1;

FIG. 4 shows typical dimensions of an enclosure for the region thermostat and is included for the purpose of aiding those skilled in the art in practicing this invention but not with any intention of in any way limiting or restricting this invention.

DETAILED DESCRIPTION OF INVENTION

Figure 9:
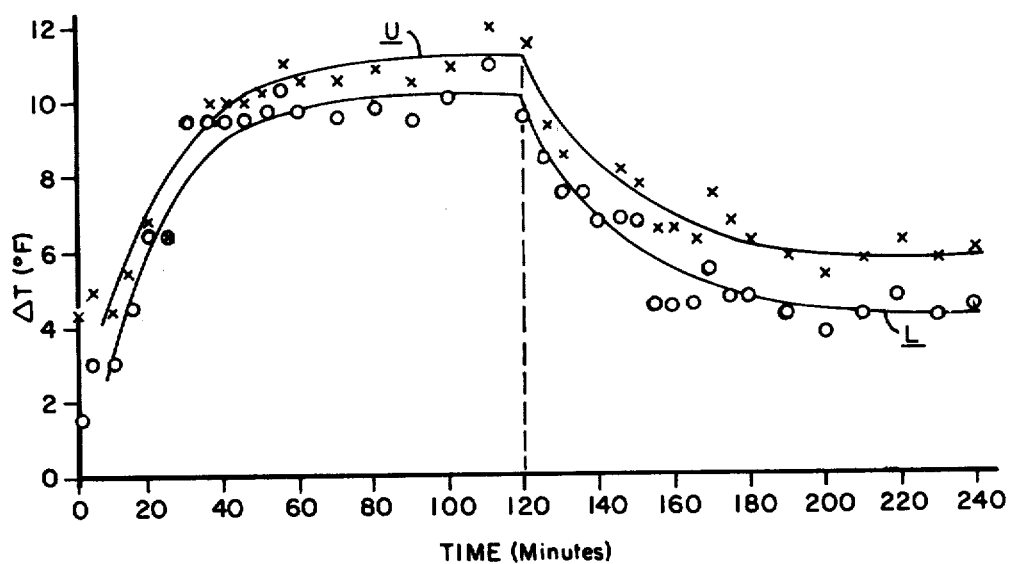
FIG. 9 is a graph illustrating the operation of this invention.

The apparatus shown in the drawings is a set-back control for a region whose temperature, aside from set-back, is controlled in conventional manner from a conventional region or room thermostat 11. Typically the thermostat 11 is 3½ inches in diameter and has a depth of about 1½ inches. The set-back control includes a first enclosure or box 13 enclosing the thermostat 11, a second enclosure or box 15 containing the heater 17 for the air flowing into the first enclosure, and a timer 19 for setting the time during which the set-back is operative. The heater is typically a low-wattage incadescent lamp with power-output of the order of six watts. However, other types of electrical heat sources of a similar power output can also be used.

The first enclosure 13 (FIG. 4) is typically molded from a transparent plastic and includes a top wall 21, side walls 23 and a front wall 24. Typically the walls are one/sixteenth inch thick. The bottom of the enclosure 13 is open except for a supporting rim 25 and the back of the enclosure 13 is open. The opening in the bottom serves as an inlet for the heated air. The enclosure 13 has windows 31 in the front wall 24 just below the top wall 21. The top wall is solid so that air cannot flow through it. A baffle plate 33 extends integrally from the front wall 24 from a position along the lower boundaries of the windows 31. The baffle 33 extends the full width of the enclosure 13 and is spaced a substantial distance from the open back of the enclosure so as to permit upward air flow along the back of the enclosure. A supporting strip 35 (FIG. 4) also extends integrally in a vertical direction from the boundary of the rim 25 which is parallel to the front wall 24.

The second enclosure 15 (FIG. 2) has front and rear walls 41 and 43, sidewalls 45 and 47 (FIG. 6) and a top wall 49 and is open at the bottom. The wall 41 is composite including an outer wall part 51 and an inner plate 53. The part 51 and the walls 45, 47 and 49 are typically of plastic and molded as an integral unit. The thickness of the plastic walls is typically one/eighth inch. The wall 43 is secured to the side walls 45 and 47 by screws (not shown). Ears 50 extend integrally from the top 49. The second enclosure 15 is secured to the wall (not shown) of the region controlled just below the thermostat 11 by bolts or screws (not shown) through holes in the ears 50. The top 49 has extensions 52 which serve to support the enclosure 13 (FIG. 1). The top 49 of enclosure 15 has windows 54 across which a screen 56 extends. The front wall 41 includes, as has been disclosed, an outer plate 51 which is integral with the top 49 and other walls and an inner plate 53 secured to the outer plate 51. Typically the plate 53 should be composed of metal, such as aluminum (typically 0.030 inch) which has high thermal conductivity and its inner surface should be polished so as to reflect radiant energy to the rear. Near the upper rim of these plates 51, 53 the inner plate 53 is provided with a portion 55 (FIGS. 2 and 7) which is separated from the outer plate 51 providing a vertical slot extending across the width of plate 49. The upper plate 49 has a slot 58 (FIG. 5) coextensive with this vertical slot through which the strip 35 of the first enclosure 13 extends. The strip 35 is a tight fit in this slot 58 so that the enclosure 13 is firmly held in the enclosure 15 by the flexibility of the parts 51 and 58 in enclosure 15 which form the slot 58. The flexibility of the boundaries of the slot 58 and the fit of the strip 35 in the slot 58 are such that the enclosure 13 is held firmly in place but can be readily removed by pulling upwardly when adjustment of the thermostat is required. The strip 35 may have a small longitudinal bead (not shown) which snaps into the slot 58 to secure the enclosure 13. A baffle plate 59 extends integrally in a horizontal direction from the plate 53. A bearing pin 61 is also secured to, and extends horizontally from, the plate 53 near its lower end.

A plate 65 (FIG. 8) is secured to the rear wall 43. This plate is coated with a black radiation-absorbing and radiating surface throughout its upper portion 67 but is reflective in its lower portion 69.

A shaft 71 (FIG. 2) is rotatably mounted on the pin 63. The shaft 71 has secured thereto a bracket 73 which holds a receptacle 75 for receiving lamp 17. A lip 77 extends upwardly from the bracket 73 and a reflector plate 79 is secured to this lip 77. The lip 77 and reflector plate 79 are secured by a screw (not shown) to a flat region 81 (FIG. 2) of shaft 71. The reflector plate 79 extends over the lamp 17 so as to reflect the radiation therefrom. At its end remote from the pin 63 the shaft 71 carries a knurled knot 83 for rotating the shaft 71 and the lamp 17 and reflector plate 79 connected to it between a position 17a (FIG. 6) in which the lamp 17 is well within enclosure 13 (maximum set-back setting) and a position 17b in which the lamp is partly outside of enclosure 13 (minimum set-back setting). The knob 83 extends outwardly through a slot 85 in side wall 45 (FIG. 7). The slot 85 has projections 87 which exert a holding frictional force on the side of the knob 83. Instead of a pivotal lamp, a lamp whose filament current is varied with a rheostat, or other dimmer control, can be used. Also lamps of different ratings can be used in a fixed lamp position; higher power for higher set-back and lower power for lower set-back.

The timer 19 is conventional. Typically it includes a rotary switch 80 controlled by a rotary cam in turn rotated by a clock (not shown) between a closed position during a set interval of a 24 hour period (usually during the night) and an open position during the remainder of the period. The switch 80 has a knurled knob 82 for setting the intervals. The timer 19 is plugged into a receptacle 84 on a receptacle panel 86. The timer is connected by a cable 88 to the lamp 17. The lamp is energized during the intervals (set-back intervals) during which the switch 80 is closed.

In use, the enclosure 15 is secured to the wall of the region below the thermostat 11. The enclosure 13 is mounted on the enclosure 15, enclosing thermostat 11, with its plate 35 held firmly in the slot between wall 51 and plate 53. The enclosure 13 is supported at the ends on extension 52. The windows 31 and the baffle 33 are above the thermostat 11. With the lamp 17 energized, the temperature in the enclosure 13, which the thermostat 11 senses, is above the region ambient temperature and the thermostat causes the region temperature to be set-back.

In the maximum set-back setting the heat from lamp 17 developed within the enclosure 15. Its radiation is reflected by the plate 79 to the walls of the enclosure. The blackened portion 67 of plate 65 absorbs radiation from the lamp 17 and becomes hot. Air flowing past this plate 65 is heated and swirls past baffle 59 through screen 56 into enclosure 13 where it is further deflected and caused to swirl by baffle 33 and then flows out through windows 31. The baffles 59 and 33 cause the air in enclosure 13 to be turbulent and well mixed and direct the air to the thermostat 11. The air in enclosure 13 is thus maintained uniformly at the maximum raised temperature. In the minimum position 17b of the lamp 17, a substantial portion of the radiation from lamp 17 is deflected outside of the enclosure 15 and does not affect the air flowing into enclosure 13.

The openings 31 in enclosure 13 and the openings permitting air flow between enclosure 15 and enclosure 13 (from enclosure 15 to enclosure 13) and the opening in (at the bottom of) enclosure 13 are sufficiently large to provide the adequate air flow coupling, required for proper set-back and normal operation response of the thermostat 11 in enclosure 13, with the outside air.

Tests were conducted to determine the variation in temperature, $\Delta T$, produced at the thermostat with a six-watt lamp 17 in maximum and minimum set-back positions. The tests were conducted with apparatus in accordance with this invention substantially as disclosed above with dimensions of the enclosure 13 as shown in FIG. 4. The lower enclosure 15 of the unit tested had the structure shown in FIG. 10. The inlet opening in the enclosure 13 was 2½ inches by 4½ inches. Temperature was measured both by a thermocouple mounted in the upper left side of the thermostat near the thermostat bimetallic control element and by a thermometer which is part of the thermostat itself. After the thermostat 11 was permitted to stabilize for 1 hour, the lamp was set in maximum position and readings were taken every 5-to-10 minutes for 120 minutes. Then the lamp 17 was set in minimum position and readings were taken for another 120 minutes.

The results, both with the thermocouple and the thermostat, are shown in FIG. 9. In FIG. 9 ΔT, the temperature in Fahrenheit degrees above ambient, is plotted vertically and time horizontally. In the upper curve U the ΔT readings are those of the thermocouple and in the lower curve L the ΔT readings are those of the thermostat. It is seen that the temperature at the thermostat is substantially constant in both settings.

Figure 10:
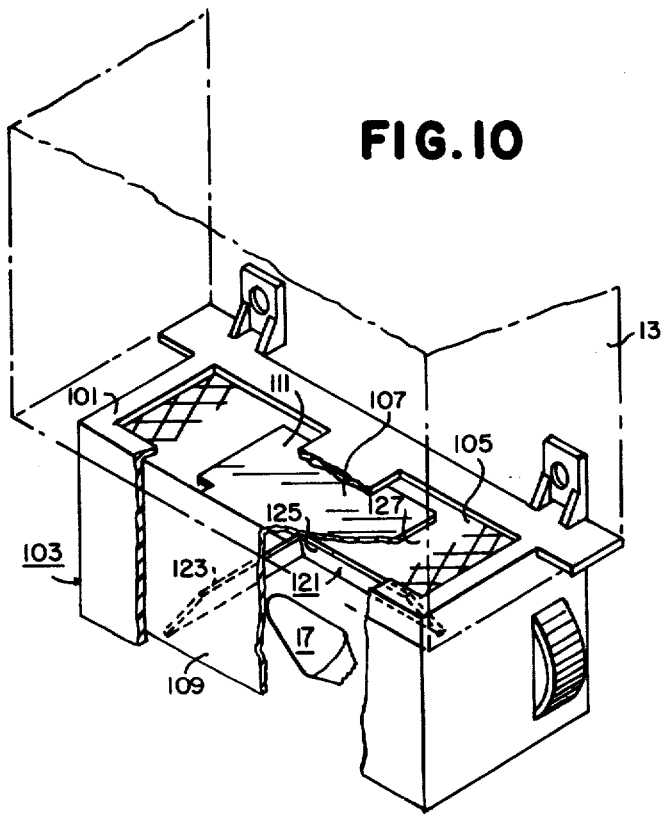
FIG. 10 is a fragmental isometric view showing a modification of this invention.

In the modification shown in FIG. 10, the top 101 of the lower chamber 103 has an opening 105. There is a T-shaped plate 107 across the opening 105. The plate 107 is integral with the front wall 109 extending at right angles to it. The plate 107 has a black heat-absorbing lower surface (not shown) and a reflective upper surface 111. The plate 107 is heated by the radiation from lamp 17 on its lower surface. The air flowing across the lower surface is heated and heats the enclosure 13. The plate 107 performs generally the same function as baffle 61 (FIG. 2).

Instead of the reflector plate 79, which, as shown in FIG. 1, moves with the lamp 17, a stationary reflector 121 is provided. This reflector 121 includes members 123 and 125 at right angles to each other and sloped to direct radiant energy downwardly when the lamp is at or near the minimum set-back setting. The reflector 121 is composed of metal, typically aluminum, polished on the faces facing the lamp 17. The reflector 121 is secured to the back plate. The plate 107 and the plate 121 reduce the coupling between enclosure 15 and the outer air and thereby reduce susceptibility to the effects of prevailing room air currents.

While preferred embodiments of this invention have been disclosed herein, many modifications thereof are feasible. This invention is not to be restricted except insofar as is necessitated by the spirit of the prior art.

I claim:

1. Temperature set-back control apparatus for setting back, during set-back intervals, the temperature of a region whose temperature is under the control of a thermostat at a position in said region sensing the temperature in said region at said position, the flow of ambient air in said region being directed towards said thermostat, the said apparatus including an enclosure enclosing said thermostat, providing a protective heated environment for said thermostat not susceptible to prevailing ambient air currents, said enclosure having an air inlet on one side of said thermostat and an air outlet on another side of said thermostat, said air outlet being transverse to the path of direct flow of said ambient air to said thermostat, switch means, operative during each of said set-back intervals to define each of said set-back intervals, and means, operable, only on said operation of said switch means during each set-back interval, connected to said enclosure, for preheating the air flowing into said inlet during said set-back intervals, thereby increasing the temperature in said enclosure and causing said thermostat to sense temperature higher than the ambient temperature in said region and to produce a set-back in said ambient temperature.

2. The apparatus of claim 1 wherein the region is defined by a vertical wall and the thermostat is mounted on said wall and the enclosure is mounted on said wall enclosing said thermostat, said inlet being in said enclosure below said thermostat and said outlet being in said enclosure above said thermostat but out of the path of downward flow of air towards said thermostat, and said preheating means being below said inlet preheating the air flowing into said inlet.

3. The apparatus of claim 1 including baffle means in the enclosure adjacent to the outlet producing turbulence of the air adjacent to said outlet.

4. The apparatus of claim 1 wherein the preheating means is a lamp, said apparatus including means, interposed between said lamp and said inlet, for absorbing the radiation from said lamp and transferring the heat derived from this absorption through said inlet to said chamber by convection.

5. The apparatus of claim 1 wherein the preheating means includes a lamp and means, connected to said lamp, for setting the position thereof to vary the heat flow into the inlet in accordance with the set-back temperature desired.

6. The apparatus of claim 1 wherein the switch means includes timing means for timing, during each set-back interval, the set-back of said temperature for a predetermined time interval and means connected to said timing means and to said preheating means for maintaining said preheating means in preheating condition during all of said predetermined interval.

7. Temperature set-back control apparatus for setting back the temperature of a region whose temperature is under the control of a thermostat at a position in said region, said thermostat sensing the temperature in said region at said position, the said apparatus including an enclosure enclosing said thermostat, providing a protective heated environment for said thermostat not susceptible to prevailing ambient turbulent air currents, said enclosure having an air inlet on one side of said thermostat and an air outlet on the other side of said thermostat, said air outlet being out of the path of direct flow of ambient air to said thermostat, and means, connected to said enclosure, for preheating the air flowing into said inlet, thereby increasing the temperature in said enclosure and causing said thermostat to sense a temperature higher than the ambient temperature in said region and to produce a set-back in said ambient temperature, said preheating means including an additional enclosure in communication with said inlet, a lamp within said additional enclosure, and pivoting means for said lamp for pivoting said lamp between a position in which the radiation from said lamp is projected within said additional enclosure and a position in which said radiation is, to a substantial extent, projected outwardly of said additional enclosure.

8. Temperature set-back control apparatus for setting back the temperature of a region bounded by a vertical wall, said temperature being under the control of a thermostat mounted on said wall within said region, said thermostat sensing the temperature in said region near said wall, the prevailing ambient air currents in said region being directed towards said thermostat, the said apparatus including an enclosure mounted on said wall enclosing said thermostat, said enclosure providing a protective heated environment for said thermostat, not susceptible to said prevailing ambient air currents, said enclosure being defined by a closed top above said thermostat a bottom, and a vertical side wall, and having an air inlet below said thermostat and an air outlet in the vertical side wall near said closed top and means, connected to said enclosure, for preheating the air flowing into said enclosure through said inlet, thereby increasing the temperature in said enclosure and causing said thermostat to sense temperature higher than the ambient temperature in said region and to produce a set-back in said ambient temperature, said means energizing said heating means independantly of said thermostat.

* * * * *